Patented Oct. 1, 1929

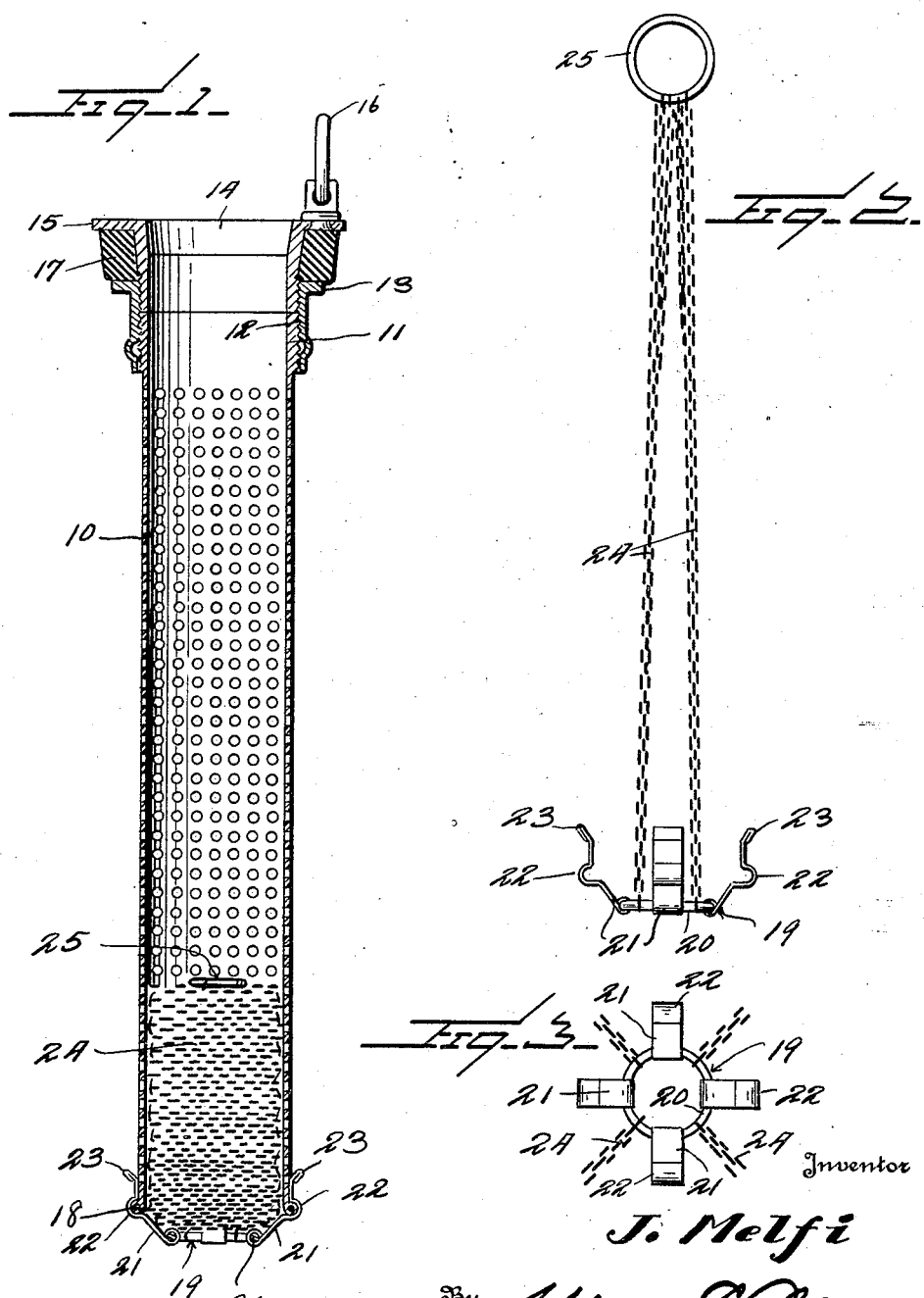

1,730,083

UNITED STATES PATENT OFFICE

JOHN MELFI, OF NASHVILLE, TENNESSEE

SINK STRAINER

Application filed February 7, 1928. Serial No. 252,574.

This invention relates to attachments for sinks, and particularly to a strainer adapted to be applied to sinks, wash basins or under like circumstances.

The general object of this present invention is to provide a sink strainer which is readily removable from the sink by merely lifting it out of the sink, which is provided at its lower end with a cleaning chain which, when the strainer is inverted, drops down into the body portion of the strainer and assists in cleansing the same, and so form the strainer that this chain and the entire lower end of the strainer may be removed.

Another object is to provide means for supporting a gasket in place on the upper end of the strainer so that the gasket will take up slight differences in the formation of the discharge opening in the sink.

Other objects will appear in the course of the following description.

My invention is illustrated in the accompanying drawing, wherein:—

Figure 1 is a longitudinal sectional view of a sink strainer constructed in accordance with my invention;

Figure 2 is an elevation of the chain and the spider-like cap of the sink strainer detached;

Figure 3 is an under side plan view of the spider showing portions of the chains;

Referring to the drawing, 10 designates a reticulated or perforated tube having at its upper end an imperforate portion 11 screw-threaded at 12 and carrying a lock nut 13. Disposed within the portion 11 and having screw-threaded engagement therewith is a flanged member 14, the flange 15 of which carries upon it the stud and ring 16 whereby the sink strainer may be lifted from the sink or inserted therein.

Disposed between the lock nut 13 and the flange 15 is the rubber gasket 17 which is so shaped upon its margin that it may be inserted in a sink opening and have practically water-tight engagement therewith. The lock nut 13 is adapted to be rotated so as to take up on this gasket and keep the gasket tightly in place.

The lower end of the strainer 10 terminates in a bead 18, and adapted to be engaged with this bead is a spider 19 formed of a central ring 20 and four legs 21 radiating therefrom formed of sheet metal having resilience, each of these legs being bent outward and upward from the ring, then downward and upward, as at 22, and then upward and outward, as at 23. These legs, therefore, form spring clamps adapted to be forced over and engage over the bead 18 and hold this spider supported at the open lower end of the strainer.

Attached to the ring 20 are a plurality of chains 24, these chains at their ends remote from the spider being connected to a ring 25. When the strainer is in the position shown in Figure 1, the chains 24 are supported by the spider in a collapsed condition at the bottom of the strainer and, therefore, to a certain extent act as a part of the strainer in preventing any particles of matter from passing downward through the strainer but permitting the passage of water or other liquid. When, however, the strainer is inverted for cleaning purposes, if the strainer be shaken, the chains will act to clean out the strainer of waste material without the necessity of dislodging the material or cleaning out the strainer by hand. The spider is entirely removable so that the chain may be removed if it be desired to give the chain and the strainer a more thorough cleansing.

It will be seen that in addition to the advantages pointed out with regard to the use of the strainer 24, the strainer may be taken out from the sink opening, inverted, and the chain shaken so as to dislodge any large particles or more or less cleanse the screen, and then the screen or strainer may be put back in place again. The rubber gasket permits the device to fit sufficiently tight within the sink opening so that there will be no passage for particles of material around the rubber gasket. The gasket, being of rubber, will compensate for slight differences or inequalities in the annular member which surrounds the sink opening and upon which the gasket rests. The ring 16 permits the device to be removed very readily and as readily inserted without bringing the hands in contact with the strainer itself.

I claim:—

1. In a sink strainer of the character described a tubular screen adapted to be inserted in the waste opening of the sink and removed therefrom, the lower end of the screen having a detachable member supporting a flexible chain in a collapsed condition within the screen when the screen is in normal position, said chain, when the screen is inverted, hanging down freely within the screen so that the screen may be cleaned by agitating the chain.

2. In a sink strainer, a tubular screen, the strainer being adapted to be inserted into a sink discharge opening, an openwork spider detachably engaged with the lower end of the screen, and a plurality of lengths of chain attached to said spider and normally resting thereon in a collapsed condition, said chain lengths, when the screen is inverted, swinging freely within the screen and adapted to cleanse the same.

3. In a sink strainer a tubular screen adapted to be inserted into a sink discharge opening, an openwork spider detachably engaged with the lower end of the screen and a plurality of lengths of chain attached to said spider and normally resting thereon in a collapsed condition, said chain lengths, when the screen is inverted, swinging freely within the screen and adapted to cleanse the same, the lower end of the screen being formed with a bead and said member having resilient clamps adapted to engage over said bead.

4. A sink strainer of the character described, including a tubular screen adapted to be inserted in the waste opening of the sink and removed therefrom, an annular support for said screen constituting a continuation of the upper end thereof and formed with an outwardly projecting flange, an interiorly screw-threaded nut engaging the upper end of the screen and the lower end of said support, the nut being flanged and a packing ring disposed between said nut and the flanged upper end of the support, and means at the lower end of the screen supporting a flexible chain with the screen in a collapsed condition when the strainer is in a normal position, said chain when the strainer is inverted hanging down within the strainer so that the screen may be cleaned by agitating the chain.

5. In a sink strainer, a tubular screen exteriorly screw-threaded at its upper end, an interiorly screw-threaded member engaging the screw-threads of the screen and projecting above the same and having a flange at its upper end, an annular member having a flange at its upper end and disposed in alinement with the screen and exteriorly screw-threaded at its lower end for engagement with said screw-threaded member, and an elastic gasket disposed between said flanges.

6. In a sink strainer, a cylindrical screen, an annular supporting member operatively engaged with the upper end of the screen, the supporting member being adapted to engage within the discharge opening of a sink and a ring engaged with the upper end of said annular supporting member whereby the strainer may be handled.

In testimony whereof I hereunto affix my signature.

JOHN MELFI.